(12) United States Patent
Shiroto et al.

(10) Patent No.: US 6,652,819 B2
(45) Date of Patent: Nov. 25, 2003

(54) PRODUCTION OF HIGH PURITY VANADIUM COMPOUND FROM VANADIUM-CONTAINING CARBONACEOUS RESIDUES

(75) Inventors: Yoshimi Shiroto, Yokohama (JP); Ataru Wakabayashi, Yokohama (JP)

(73) Assignee: Chiyoda Corporation (JP)

( * ) Notice: Subject to any disclaimer, the term of this patent is extended or adjusted under 35 U.S.C. 154(b) by 329 days.

(21) Appl. No.: 09/873,202

(22) Filed: Jun. 5, 2001

(65) Prior Publication Data

US 2002/0112968 A1 Aug. 22, 2002

(30) Foreign Application Priority Data

Dec. 15, 2000 (JP) ........................................ 2000-382377

(51) Int. Cl.[7] .............................................. C01G 31/00
(52) U.S. Cl. ........................... 423/62; 423/63; 423/67; 423/511; 423/544; 423/549; 429/101; 429/105; 429/204; 429/205; 252/62.2; 252/506; 252/520.4; 205/496; 205/554
(58) Field of Search .............................. 423/62, 63, 67, 423/511, 544, 549; 252/62.2, 506, 520.4; 429/101, 105, 204, 205; 205/496, 554

(56) References Cited

U.S. PATENT DOCUMENTS 5,250,158 A * 10/1993 Kaneko et al. ............. 423/409
5,368,762 A * 11/1994 Sato et al. .................. 252/62.2
5,587,132 A * 12/1996 Nakajima et al. ............. 423/62

FOREIGN PATENT DOCUMENTS

JP 08325651 A 12/1996
JP 10251025 A 9/1998

* cited by examiner

*Primary Examiner*—Bruce F. Bell
(74) *Attorney, Agent, or Firm*—Lorusso, Loud & Kelly

(57) ABSTRACT

A process for the production of a vanadium compound from carbonaceous residues containing vanadium, which includes the steps of:

(a) combusting the carbonaceous residues at a temperature of 500–690° C. in an oxygen-containing gas to form vanadium-containing combustion residues;

(b) heating the vanadium-containing combustion residues at a temperature T in ° C. under an oxygen partial pressure of at most T in kPa wherein T and P meet with the following conditions:

$$log_{10}(P) = -3.45 \times 10^{-3} \times T + 2.21$$

$$500 \leq T \leq 1300$$

to obtain a solid product containing less than 5% by weight of carbon and vanadium at least 80% of which is tetravalent vanadium oxide;

(c) selectively leach tetravalent vanadium ion with sulfuring acid at pH in the range of 1.5–4;

(d) separating a liquid phase from the leached mixture;

(e) adding an alkaline substance to the liquid phase to adjust the pH thereof in the range of 4.5–7.5 and to selectively precipitate vanadium ion as a tetravalent vanadium compound; and (f) separating the precipitates.

9 Claims, No Drawings

PRODUCTION OF HIGH PURITY VANADIUM COMPOUND FROM VANADIUM-CONTAINING CARBONACEOUS RESIDUES

BACKGROUND OF THE INVENTION

This invention relates to a process for the production of a high purity vanadium compound from vanadium-containing carbonaceous residues containing at least about 20% by weight of carbon and at least about 1% by weight of vanadium, each on dry basis, by combined dry and wet treatments.

Various processes have been hitherto proposed to recover vanadium from vanadium-containing carbonaceous residues. Generally adopted are wet treatment methods in which a mixture of the carbonaceous residues and water is subjected to multi-stage leaching and precipitation treatments through pH adjustment and oxidation/reduction (JP-A-H08-325651 and H10-251025). Wet treatment methods require complicated troublesome repetition of steps for isolating vanadium from other metals. Further, since vanadium content in the carbonaceous residues is low, leaching of vanadium therefrom cannot be efficiently performed.

To cope with the above problems, dry treatment methods have been proposed (U.S. Pat. Nos. 3,661,543, 3,702,516, 3,759,676, 4,203,759, 4,420,464, 4,816,236, 5,277,795, 5,466,383 and 5,670,061) in which vanadium-containing carbonaceous residues are combusted to remove carbon to form vanadium-concentrated ash from which vanadium is subsequently recovered by leaching with a strong alkali or acid. However, the dry treatment methods in which the carbonaceous residues are mixed with alkali metal hydroxides or carbonates and the mixture is combusted in an oxygen-containing atmosphere to remove carbon with the simultaneous conversion of vanadium into water-soluble fused mixture still have problems. In particular, the dry treatment methods require a relatively large amount of expensive alkali metal compounds in the combustion stage and a relatively large amount of strong alkali or acid in the leaching stage.

SUMMARY OF THE INVENTION

It is, therefore, an object of the present invention to provide an economical process which can efficiently produce a high purity vanadium compound from vanadium-containing carbonaceous residues.

It is a special object of the present invention to provide a vanadium sulfate electrolyte solution.

In accomplishing the above objects, the present invention provides a process for the production of a vanadium compound from carbonaceous residues containing at least about 20% by weight of carbon and at least about 1% by weight of vanadium, which comprises the steps of:

(a) combusting the carbonaceous residues at a temperature of 500–690° C. using an oxygen-containing gas to form vanadium-containing combustion residues;

(b) heating the vanadium-containing combustion residues at a temperature T in ° C. under an oxygen partial pressure of at most T in kPa wherein T and P meet with the following conditions:

$log_{10}(P) = -3.45 \times 10^{-3} \times T + 2.21$ $500 \leq T \leq 1300$ to obtain a solid product containing less than 5% by weight of carbon and vanadium at least 80% of which is tetravalent vanadium oxide;

(c) mixing the solid product with water and sulfuric acid to form a mixture and to selectively leach tetravalent vanadium ion while maintaining the pH of the mixture in the range of 1.5–4;

(d) separating a liquid phase from the mixture;

(e) adding an alkaline substance to the liquid phase to adjust the pH thereof in the range of 4.5–7.5 and to selectively precipitate vanadium ion as a tetravalent vanadium compound; and (f) separating the precipitates obtained in step (e).

In another aspect, the present invention provides a method of preparing a vanadium sulfate electrolyte for a redox flow battery, which comprises subjecting a vanadium sulfate solution containing nickel ion to electrolytic reduction in a cathode chamber in the presence of tin ion to decrease the oxidation-reduction potential of the solution to −0.2 V or below on the basis of the standard hydrogen electrode, and to precipitate and remove nickel ion from the solution.

Other objects, features and advantages of the present invention will become apparent from the detailed description of the preferred embodiments of the invention to follow.

DETAILED DESCRIPTION OF THE PREFERRED EMBODIMENTS OF THE INVENTION

Carbonaceous residues containing at least about 20% by weight, generally at least about 50% by weight, of carbon and at least about 1% by weight of vanadium are used as a raw material for the production of a vanadium compound according to the present invention. Such residues are generally comprised of inorganic substances containing vanadium and a carbonaceous material containing heavy hydrocarbons. Examples of such carbonaceous residues include carbon sludge from a heavy oil gasification reactor, fly ash from a heavy oil combustion boiler and petroleum pitch or coke from a heavy oil thermal cracking reactor.

As used herein, "carbon sludge from a heavy oil gasification reactor" refer to a wet solid containing carbon and ash and obtained in gasifying heavy hydrocarbon oil, such as vacuum residue of petroleum crude, by partial oxidation. The gas product from the gasification reactor is washed and purified with water. The used washing water which is obtained as a by-product in the purification of the gas product is in the form of a soot-containing water slurry (soot water). The soot water is filtered to give the wet solid containing carbon and ash.

As used herein, "fly ash from a heavy oil combustion boiler" refer to a solid containing (a) carbon produced in combustion of heavy oil in a boiler, (b) ash derived from heavy metals, such as vanadium, nickel and iron, contained in the heavy oil and optionally (c) ammonium sulfate formed when ammonia is fed for the purpose of preventing corrosion of a duct and a dust collector by sulfuric anhydride ($SO_3$).

As used herein, "petroleum pitch or coke from a heavy oil thermal cracking reactor" refer to pitch or coke produced as by-product by cracking petroleum heavy oil in a reactor such as a delayed coker, flexicoker or visbraker and containing carbon as a major ingredient and heavy metals such as vanadium and nickel derived from the heavy oil.

As used herein, "at least about 20% by weight of carbon" refer to an amount of carbon element of at least about 20% by weight on dry basis when measured in accordance with the analytical method defined in Japanese Industrial Standards JIS M 8813.

The carbonaceous residues used as a raw material in the present invention may contain water in an amount of 10–90% by weight. When the water content is high, it is preferred that the carbonaceous residues be dried at a temperature of about 400° C. or lower. Too high a drying temperature above about 400° C. is disadvantageous because of significant dust formation. When a combustion step, which will be described hereinafter, is carried out using a fluidized bed system, it is desired that the dried carbonaceous residues be ground to a weight average particle diameter of 400 µm or less, more preferably 200 µm or less, for reasons of fluidizability and easiness in handling of the carbonaceous residues.

In the process of the present invention, the carbonaceous residues are subjected to a combined dry and wet treatment.

In the dry treatment, the carbonaceous residues are combusted at a temperature of 500–690° C. using an oxygen-containing gas to form vanadium-containing combustion residues (step (a)). A combustion temperature below 500° C. is insufficient to reduce the amount of carbon within an acceptable period of time. Too high a combustion temperature above 690° C. causes fusion of vanadium oxide (e.g. $V_2O_5$) and agglomeration of the combustion residues so that difficulties are caused for handling thereof. Further, such a high temperature will cause vaporization of vanadium compounds which then deposit on inside walls of the combustion furnace and its associated pipes. Generally, the combustion is performed so that the carbon content is reduced to less than 10 weight.

The vanadium-containing combustion residues are then heated at a temperature T in ° C. (degrees centigrade) under an oxygen partial pressure of at most P in kPa wherein T and P meet with the following conditions:

$$log_{10}(P) = -3.45 \times 10^{-3} \times T + 2.21$$

$$500 \leq T \leq 1300$$

to obtain a solid product containing less than 5% by weight of carbon and vanadium at least 80% of which is tetravalent vanadium oxide (step (b)).

It is important that the heat treatment of the vanadium-containing combustion residues should be performed at a low oxygen partial pressure of P kPa or less, in order to efficiently convert the vanadium compounds ($V_2O_5$ is major ingredient) into tetravalent vanadium compounds ($V_2O_4$ or $VO_2$). The oxygen partial pressure in the heat treatment environment may be measured with any suitable known oxygen sensor or may be calculated from analytical data for the exhaust gas on the basis of chemical stoichiometry of combustion reactions.

The above dry treatment including the steps (a) and (b) may be carried out using any suitable devices such as multiple hearth furnaces, rotary kiln incinerators, fluidized bed combustion furnaces, air flow combustion furnaces and solid indirect contact furnaces (muffle furnaces). Combustion methods and apparatuses suitable for carrying out the dry treatment are disclosed in "Handbook of Chemical Engineering", 4th Edition, edited by Chemical Engineering Association, pages 257–314, 1958, Maruzen; "R. H. Perry & C. H. Chilton, Chemical Engineers' Handbook, 5th Edition, p.9–1 to p.11–54, 1973, McGrow-Hill Kogakusha, Ltd.; and Tsutomu Fukumoto, "Waste Material Treatment Technology", 2nd Edition, 1998, Kyoritsu Shuppan, the disclosure of which is hereby incorporated by reference herein.

The above dry treatment including the steps (a) and (b) may be carried out using a single furnace. In the case of, for example, a multiple hearth furnace, an upper part of the furnace is used for drying the carbonaceous residues at 400° C. or less. In a middle part of the furnace, the dried carbonaceous residues are combusted at 500–690° C. with an oxygen-containing gas such as air (step (a)). In a lower part of the furnace, the resultant vanadium-containing combustion residues are thermally treated under the above-described conditions.

The above dry treatment may also be performed using a combination of two kinds of furnaces. For example, a multiple hearth furnace is used to carry out the drying and the step (a), while a fluidized bed combustion furnace is used to carry out the step (b). Apparatuses shown in U.S. Pat. Nos. 4,203,759, 5,427,603 and 5,670,061 may be suitably used to carry out the dry treatment of the present invention, the disclosure of which is hereby incorporated by reference herein.

The above dry treatment may also be suitably performed using the air flow combustion furnace (including pulverized coal firing system) such as described in U.S. Pat. No. 5,277,795, the disclosure of which is hereby incorporated by reference herein.

It is preferred that at least part of the exhaust gases from the step (a) and/or the step (b) be recycled to the step (b) for reasons of easiness of controlling the oxygen partial pressure. Feeding of reducing gas containing gaseous components such as CO, $SO_2$, etc., an inert gas and/or steam to the step (b) can also make it easy to control the oxygen partial pressure and is preferred. It is also preferred that a reducing gas be fed to the step (b) for reasons of facilitation of conversion of $V_2O_5$ to $V_2O_4$ or $VO_2$.

When the amount of heat generated by the combustion of carbon of the carbonaceous residues is insufficient to perform the above-described dry treatment, an auxiliary fuel may be additionally combusted in the step (b). It is desirable to recover the waste heat from the dry treatment by any suitable known method. For example, the waste heat may be used for preheating oxygen-containing gas such as air for use in combustion of the carbonaceous residues and for forming steam in a boiler. Utilization of waste heat is described in detail in Tsutomu Fukumoto, "Waste Material Treatment Technology", 2nd Edition, 1998, Kyoritsu Shuppan, the disclosure of which is hereby incorporated by reference herein.

As a result of the above dry treatment, vanadium in the combustion residues is present in a concentrated state in the solid product. Therefore, the vanadium may be efficiently recovered in the succeeding wet treatment described hereinafter. Further, since pentavalent vanadium ($V_2O_5$) which is the major vanadium compound in the combustion residues and which requires strong acid or strong alkali (pH 2 or less or pH 11 or more) for leaching is converted in the step (b) to tetravalent vanadium ($V_2O_4$) which can be leached at milder pH conditions, the succeeding wet treatment can be carried out easily and at reduced costs.

In the wet treatment, the solid product obtained in the step (b) and containing less than 5% by weight of carbon and vanadium, at least 80% of which is tetravalent vanadium oxide, is mixed with water and sulfuric acid to form a mixture having a pH in the range of 1.5–4, preferably 2–3, and to selectively leach tetravalent vanadium ion (step (c)). The leaching is generally performed from room temperature to about 100° C., preferably at 50–80° C.

The resulting mixture in the step (c) is then separated into a liquid phase containing the dissolved vanadium salt and a solid phase containing undissolved ash such as silica and iron oxide (step (d)).

The liquid phase is then mixed with an alkaline substance to adjust the pH thereof in the range of 4.5–7.5, preferably 5–7, to selectively precipitate vanadium ion as a tetravalent vanadium compound, mainly $VO(OH)_2$ (step (e)). The alkaline substance is preferably ammonia or ammonia water. When the pH is less than 4.5, precipitation of the tetravalent vanadium compound does not sufficiently proceed. Too high a pH of more than 7.5 causes precipitation of other metal compounds such as Ni, Fe and Mg compounds, so that the purity of vanadium is lowered.

It is preferred that, before step (e), a reducing agent be added to the liquid phase to convert ferric ion, if contained, into ferrous ion. The reducing agent may be, for example, sulfur dioxide gas ($SO_2$), ammonium sulfite, sodium sulfite, hydrazine or L-ascorbic acid and may be used in an amount of 1–5 electrochemical equivalents, preferably 1.2–2 equivalents. By the addition of the reducing agent, ferric ion is converted into ferrous ion which does not precipitate during the succeeding step (e).

The precipitates of the tetravalent vanadium compound obtained in step (e) are separated by, for example, filtration (step (f)). Thus, a high purity vanadium compound (tetravalent vanadium compound) can be obtained by the above combination of the dry and wet treatment with a yield of more than 70% on the elemental basis. For the purpose of preventing oxidation of tetravalent vanadium to pentavalent vanadium and of ferrous ion to ferric ion, it is desirable to perform the wet treatment including the steps (c)–(f) while preventing the treatment atmosphere from contacting with air.

By reacting the thus obtained precipitates of tetravalent vanadium compound (mainly $VO(OH)_2$) with concentrated sulfuric acid, a solution of vanadium sulfate may be obtained. The solution may be suitably used as an electrolyte for redox flow battery having an electromotive force of about 1.3 V.

Hitherto, a vanadium sulfate solution for redox flow battery has been prepared by, for example, a method wherein ammonium methavanadate and vanadium pentoxide are reduced with sulfurous acid in the presence of an inorganic acid, followed by addition of concentrated sulfuric acid (JP-A-H05-303973), or a method wherein vanadium pentoxide and ammonium methavanadate containing impurities are heated in an acidic condition to precipitate ammonium trivanadate, which is then isolated and oxidized at an elevated temperature to form high purity vanadium pentoxide giving vanadium sulfate electrolyte upon being dissolved in sulfuric acid (JP-A-H10-251025 and H11-79748). These methods have drawbacks because troublesome steps are required and because it is difficult to constantly obtain purified electrolyte. Also proposed is a method wherein a vanadium oxide containing $V_2O_5$ or $V_6O_{13}$ as its major component is heated in a reducing atmosphere (in hydrogen stream) to form a reduced vanadium oxide containing $V_2O_3$ or $V_2O_4$ as its major component, followed by dissolution in sulfuric acid (JP-A-H08-273692, H10-125345 and 2000-72441). This process requires reduction with hydrogen at high temperature and cannot be easily carried out.

According to the present invention, the dry treatment of the carbonaceous residues can form, without specific reduction treatment as required in the conventional method, a tetravalent vanadium compound which can be easily recovered and can give tetravalent vanadium sulfate electrolyte for use as a positive electrolyte of a redox flow battery. More particularly, the high purity tetravalent vanadium compound obtained in the above-described wet treatment is dispersed in water, to which concentrated sulfuric acid is then added to dissolve the vanadium compound and react same with the sulfuric acid, thereby to form a vanadium sulfate electrolyte. The electrolyte preferably has a vanadium concentration of 1–3 mole/L and a sulfuric acid concentration of 2–7 mole/L.

It is important that the vanadium sulfate electrolyte should be substantially free of nickel, since otherwise nickel having a low hydrogen evolution overvoltage will deposit on an negative electrode during charging to accelerate side reactions resulting in the generation of hydrogen gas, so that the current efficiency (coulomb efficiency) is considerably lowered and the battery capacity is reduced. Depending upon the carbonaceous residues used as the raw material, the vanadium sulfate electrolyte obtained by the above method may contain nickel in an amount of several tens ppm by weight.

Thus, for the purpose of removing nickel from the vanadium sulfate solution, the solution is preferably subjected to electrolytic reduction in a cathode chamber in the presence of tin ion to deposit nickel on the cathode together with tin from the solution. As a source of tin ion, a tin compound such as stannous sulfate may be used. When the electrolyte contain sulfuric acid, metallic tin can be used as a source of tin ion.

In one preferred embodiment, an amount of a tin ion source such as stannous sulfate is dissolved in the vanadium sulfate solution obtained by reaction of the tetravanadium compound with concentrated sulfuric acid. The resulting solution is fed to a cathode chamber of an electrolysis vessel. Then, electrolytic reduction is carried out until the oxidation-reduction potential of the solution is decreased to −0.2 V or below on the basis of the standard hydrogen electrode (SHE). During the course of the electrolytic reduction, nickel gradually deposits on the cathode. Simultaneously, tin begins depositing on the same electrode. Thus, even when nickel deposits on the cathode, evolution of hydrogen is suppressed, because tin having a higher hydrogen evolution overvoltage deposits to cover the nickel deposits. Therefore, as the oxidation-reduction potential of the solution is decreased to required −0.2 V or below on the basis of SHE, it is possible to reduce the nickel content in the vanadium sulfate solution to 10 ppm or less, preferably 5 ppm or less, more preferably 1 ppm or less. The resulting vanadium sulfate solution is thus very suited for use as an electrolyte for redox flow battery. Without tin ion, hydrogen gas is formed in a large amount and it is impossible to decrease the oxidation-reduction potential of the solution to −0.2V or below on the basis of SHE. In other words, the presence of tin ion is essential in order to reduce the nickel concentration to 10 ppm or less. It is preferred that tin ion be present in an amount of at least 2 times the mole, more preferably 3–30 times the mole, of the nickel contained in the vanadium sulfate solution. During the above electrolytic reduction, metals having a low hydrogen evolution overvoltage, such as noble metals (e.g. Pt) and Cu are also removed together with nickel. As a cathode for use in the electrolytic reduction, there may be used a material having a high hydrogen overvoltage, such as a metal electrode (e.g. lead) or a carbon electrode (e.g. graphite plate or carbon fiber). The electrolytic reduction may be generally performed by constant current electrolysis, controlled potential electrolysis or a combination thereof.

The cathode having deposits of nickel and tin formed as a result of the above electrolytic reduction of the vanadium-containing solution can be regenerated by electrolytic oxidation in an aqueous sulfuric acid. Thus, after the vanadium-containing solution in the cathode chamber has been replaced by aqueous sulfuric acid, anodic oxidation is performed to dissolve nickel and tin deposits as follows:

$Ni \rightarrow Ni^{2+} + 2e$ $Sn \rightarrow Sn^{2+} + 2e$ thereby to clean the cathode. The thus regenerated cathode can be used again for the removal of nickel.

Simplified charging and discharging reactions in the vanadium redox flow battery are as follows:

Anode: $V^{5+} + e \leftrightarrows V^{4+}$

Cathode: $V^{2+} \leftrightarrows V^{3+} + e$ wherein the reactions from right to left and from left to right occur during charging and discharging, respectively. Thus, a tetravalent vanadium sulfate solution and a trivalent vanadium sulfate solution are preferably used as positive and negative electrolytes, respectively. It is also preferred that a mixed solution of $V^{4+}:V^{3+}=1:1$ be initially used as each of the positive and negative electrolytes. The vanadium components contained in the vanadium sulfate solution obtained by the above-described electrolytic reduction are in the form of divalent vanadium. Thus, the vanadium sulfate solution is subjected to an oxidation treatment, such as by reaction with an oxidizing agent (e.g. oxygen-containing gas) or by electrolytic oxidation, to control the valence of the vanadium to the above desired state.

The following examples will further illustrate the present invention. As vanadium-containing carbonaceous residues for a raw material, carbon sludge is used. The carbon sludge was obtained as follows. A heavy residual oil was partially oxidized in an industrial gasification reactor. The gas produced was washed with water to obtain an soot water. The soot water was then filtered and pressed with a filter press to obtain carbon sludge containing 81% by weight of water. About 3 kg of the sludge was heated at 250–350° C. for about 1 hour in air using a rotary electric oven to obtain dried sludge having the following composition:

| Carbon:    | 78.0% by weight  |
|------------|------------------|
| Vanadium:  | 8.2% by weight   |
| Nickel:    | 1.8% by weight   |
| Others:    | 12.0% by weight. |

The dried sludge was pulverized with a roll mill to obtain a raw material sample which was used in the following examples.

EXAMPLE 1

Dry Treatment

The raw material sample was subjected to a dry treatment using a tubular fixed bed reactor having an inside diameter of 25 mm and a length of 1.5 m an surrounded by four, vertically separated electric heaters adapted to control heating temperatures. Granular inert alumina beads (α-alumina) having an average particle diameter of 1 mm was packed in the bottom portion of the reactor to a height of about 50 cm. This portion of the reactor served as a preheating zone for a gas supplied therethrough. The raw material sample (100 g) was placed on the preheating zone. The same alumina beads were further placed on the raw material sample to a thickness of about 50 cm for the purpose of preventing escape of the raw material sample. The temperature distribution in the reactor was monitored using thermocouples. Throughout the drying treatment, the pressure inside the reactor was maintained at 0.1 MPa in terms of gauge pressure. The dry treatment was performed as follows:

(a) Combustion Treatment:

Combustion air was heated to about 300° C. in a gas preheater and was fed to the bottom of the reactor. The heater around the reactor and the flow rate of the combustion air were adjusted so that the raw material sample during combustion was maintained at 550–650° C., thereby combusting the sample raw material. The combustion was continued for 1 hour after the temperature thereof had increased to 550° C. to obtain combustion residues.

(b) Heat Treatment:

After the combustion treatment, the combustion air was replaced by nitrogen gas to perform a heat treatment of the combustion residues at about 800–850° C. The heat treatment was continued for about 1 hour after the temperature of the combustion residues had increased to about 800° C. The oxygen partial pressure, which was determined from the composition of the gas discharged from the reactor and the pressure within the reactor, was found to be 0.19 kPa (at 850° C.) to 0.28 kPa (at 800° C.). The amount of the heat-treated combustion residues recovered after the heat treatment was 18.7 g and the composition thereof was as follows:

| Carbon:    | 1.7% by weight  |
|------------|-----------------|
| Vanadium:  | 38.0% by weight |
| Nickel:    | 8.9% by weight  |
| Iron:      | 4.0% by weight  |
| Others:    | 47.4% by weight.|

The X-ray diffraction analysis revealed that the vanadium contained in the heat treated residues was $VO_2$. The above procedures were repeated 4 times in the same manner as above to obtain about 90 g of the heat treated residues in total.

Wet Treatment (c) Leaching

The heat treated residues (about 90 g) was placed in a 2L three-necked flask together with 1L of purified water. Sulfuric acid was then added to the flask, while heating the mixture with stirring using hot magnetic stirrer. A Liebig condenser was fitted on the flask and the leaching of vanadium was carried out at a temperature of 60° C. and a pH of 2.5 for 3 hours under reflux.

(d) Separation of Liquid Phase

After the leaching had been completed, the mixture in the flask was separated by filtration into a liquid phase and a solid phase. The atomic absorption spectrometry revealed that the liquid phase had the following composition:

| Vanadium: | 0.54 mol/L                                |
|-----------|-------------------------------------------|
| Nickel:   | 0.1 mol/L                                 |
| Iron:     | 0.03 mol/L (trivalent iron: 0.003 mol/L)  |

(e) Selective Precipitation

The liquid phase (0.5 L) was mixed with 0.002 mol of ammonium sulfite and was adjusted to pH of about 5 using aqueous ammonia to precipitate vanadium hydroxide. The precipitates were separated by filtration, washed with water (pH 5, adjusted with sulfuric acid) and dried under vacuum. The dried precipitates were found to be substantially tetravalent vanadium hydroxide and contain 0.015% by weight of iron and 0.05% of nickel on the basis of metallic vanadium. The yield of vanadium was 78% on the basis of the heat treated residues obtained in step (b) above.

EXAMPLE 2

The liquid phase (0.3 L) obtained in step (d) of Example 1 was mixed with 0.002 mol of ammonium sulfite and was adjusted to pH of about 5 using aqueous ammonia to precipitate vanadium hydroxide. The precipitates were separated by filtration and washed with water (pH 5, adjusted with sulfuric acid) to obtain a cake. The cake was mixed with water and with concentrated sulfuric acid to obtain 80 mL of a vanadium sulfate solution having a vanadium sulfate concentration of 1.98 mol/L, a nickel content of 50 ppm and a sulfuric acid concentration of 2 mol/L. The yield of vanadium was 78% on the basis of the heat treated residues obtained in step (b) above.

EXAMPLE 3

The vanadium sulfate solution obtained in Example 2 was mixed with stannous sulfate to provide a tin concentration of 0.01 mol/L. The solution was then feeded in a cathode chamber of an electrolysis vessel. A glassy carbon plate was used as the cathode. The electrolytic reduction was carried out at a current density of 20 mA/cm$^2$ until the oxidation-reduction potential of the solution was −0.4 V on the basis of SHE. The atomic absorption spectrometry revealed that the vanadium sulfate solution had a nickel content of 0.3 ppm.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. 2000-382377, filed Dec. 15, 2000 are hereby incorporated by reference herein.

What is claimed is:

1. A process for the production of a vanadium compound from carbonaceous residues containing at least about 20% by weight of carbon and at least about 1% by weight of vanadium, comprising the steps of:

(a) combusting said carbonaceous residues at a temperature of 500–690° C. using an oxygen-containing gas to form vanadium-containing combustion residues;

(b) heating said vanadium-containing combustion residues at a temperature T in ° C. under an oxygen partial pressure of at most P in kPa wherein T and P meet with the following conditions:

$$log_{10}(P) = -3.45 \times 10^{-3} \times T^4 + 2.21$$

$$500 \leq T \leq 1300$$

to obtain a solid product containing less than 5% by weight of carbon and vanadium at least 80% of which is tetravalent vanadium oxide;

(c) mixing said solid product with water and sulfuric acid to form a mixture and to selectively leach tetravalent vanadium ion while maintaining the pH of said mixture in the range of 1.5–4;

(d) separating a liquid phase from said mixture;

(e) adding an alkaline substance to said liquid phase to adjust the pH thereof in the range of 4.5–7.5 and to selectively precipitate vanadium ion as a tetravalent vanadium compound; and (f) separating the precipitates obtained in step (e).

2. A process as claimed in claim 1, wherein, before step (e), a reducing agent is added to said liquid phase to convert ferric ion contained in said liquid phase into ferrous ion.

3. A process as claimed in claim 1, wherein at least part of exhaust gases from step (a) and/or step (b) is recycled to step (b).

4. A process as claimed in claim 1, wherein at least one gas selected from the group consisting of a reducing gas, an inert gas and steam is fed to step (b).

5. A process as claimed in claim 1, further comprising the step of:

(g) reacting said precipitates with concentrated sulfuric acid to obtain a solution of vanadium sulfate.

6. A process as claimed in claim 5, further comprising subjecting said vanadium sulfate solution to electrolytic reduction in a cathode chamber in the presence of tin ion to decrease the oxidation-reduction potential of said solution to −0.2 V or below on the basis of the standard hydrogen electrode, and to deposit nickel contained in said solution on the cathode together with tin.

7. A process as claimed in claim 6, further comprising oxidizing said solution from which nickel ion has been removed so that the molar ratio of trivalent vanadium to tetravalent vanadium of about 1:1 is reached, wherein said oxidizing is by addition of an oxidizing agent or by electrolytic oxidation.

8. A method of preparing a vanadium sulfate electrolyte for a redox flow battery, comprising subjecting a vanadium sulfate solution containing nickel ion to electrolytic reduction in a cathode chamber in the presence of tin ion to decrease the oxidation-reduction potential of said solution to −0.2 V or below on the basis of the standard hydrogen electrode, and to deposit nickel contained in said solution on the cathode together with tin.

9. A method as claimed in claim 8, further comprising oxidizing said solution from which nickel ion has been removed such that the molar ratio of trivalent vanadium to tetravalent vanadium of about 1:1 is reached, wherein said oxidizing is by addition of an oxidizing agent or by electrolytic oxidation.

* * * * *